March 1, 1955 — A. R. BIEDESS — 2,702,995
SHOCK ABSORBING GEARING
Filed Dec. 31, 1953 — 2 Sheets-Sheet 1
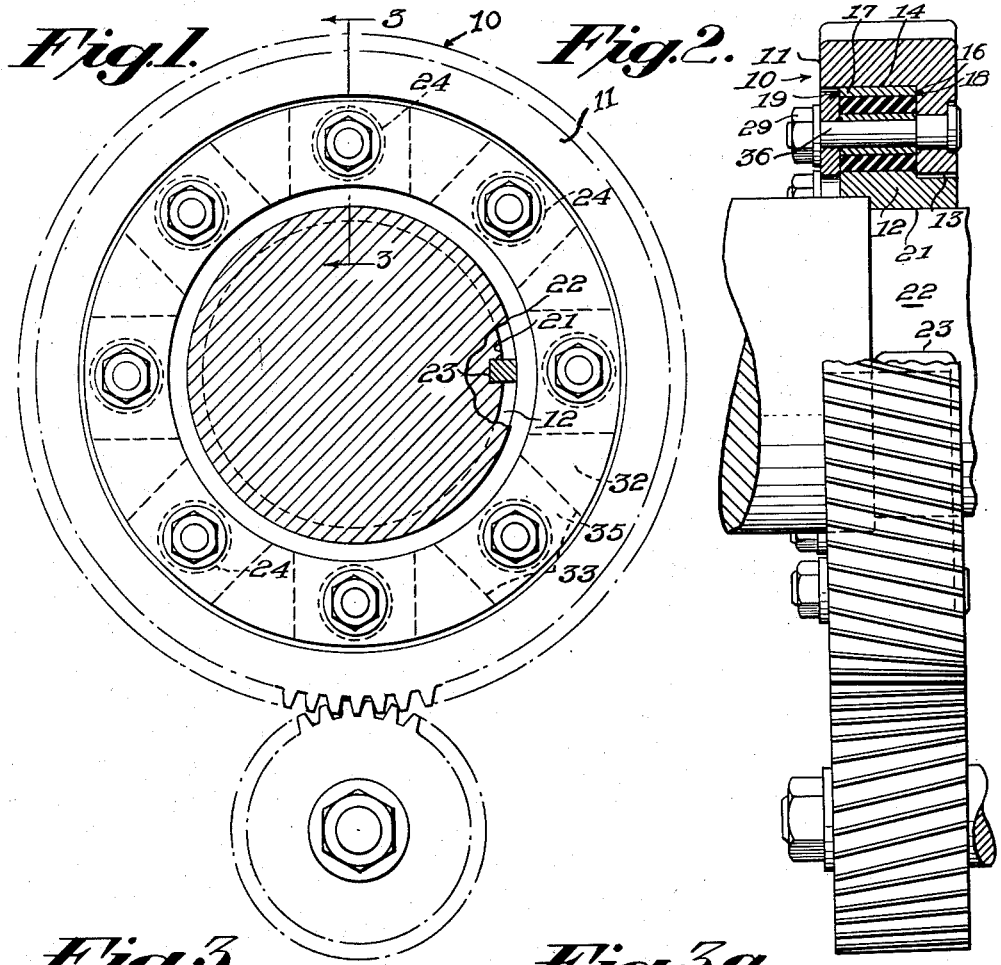
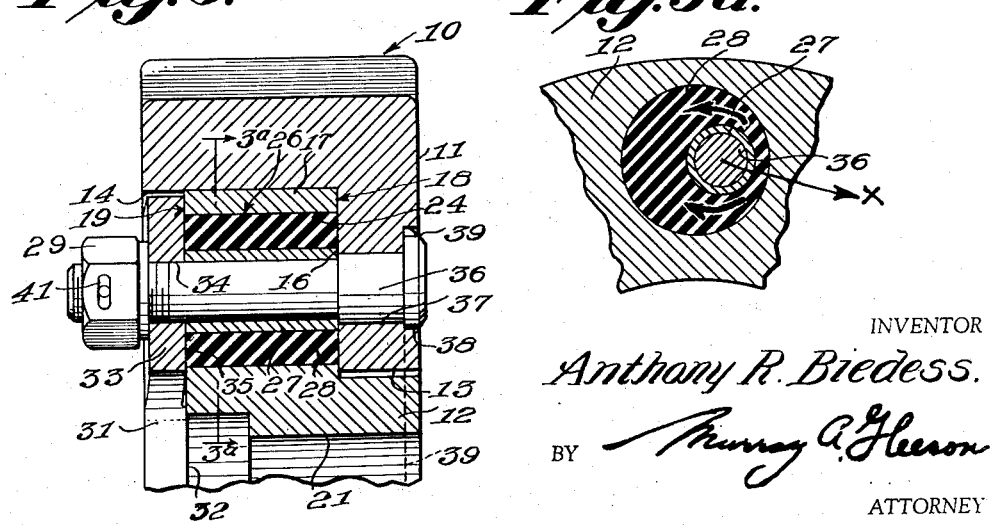
INVENTOR
Anthony R. Biedess.
BY
ATTORNEY

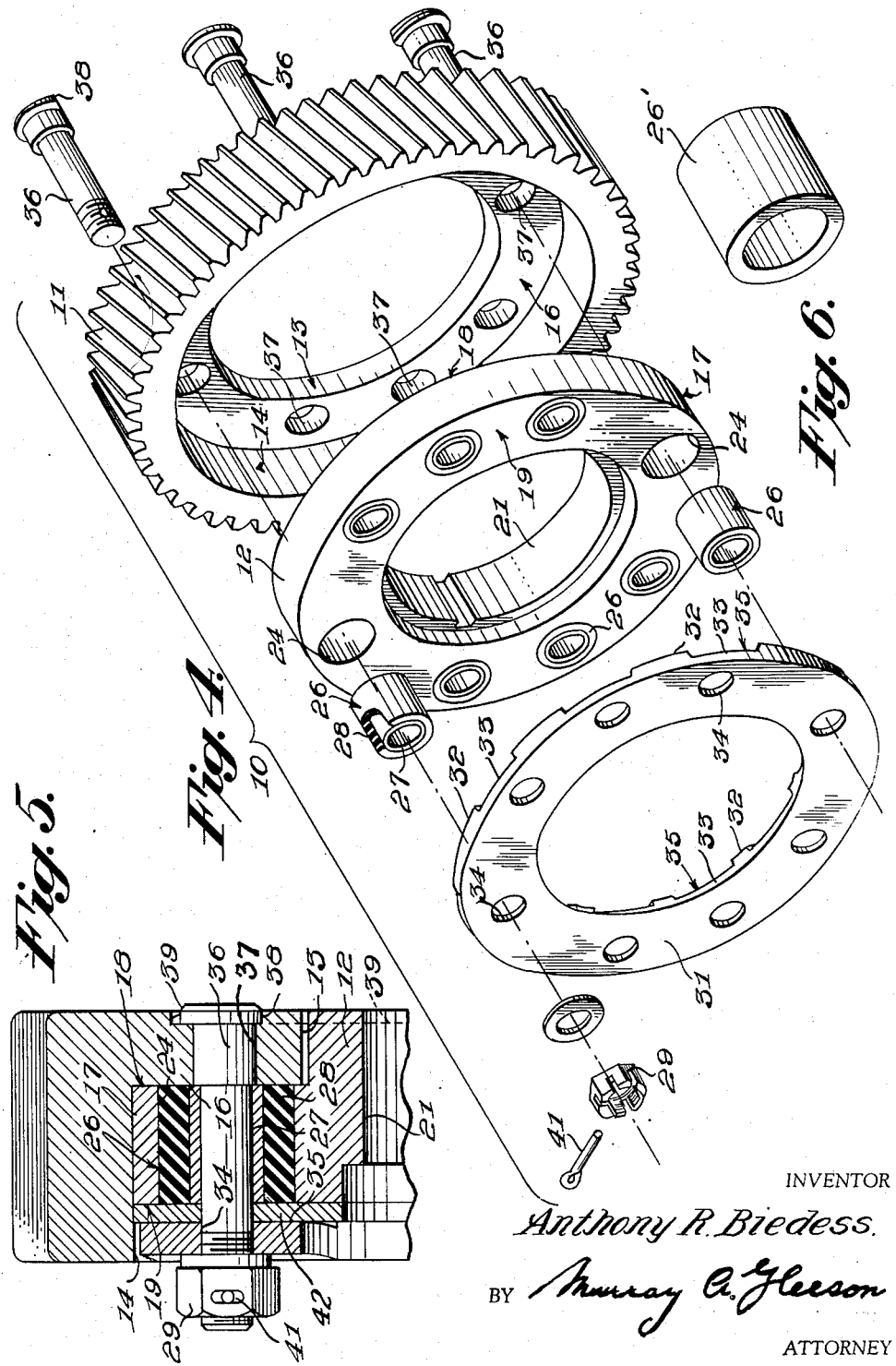

2,702,995
Patented Mar. 1, 1955

United States Patent Office

2,702,995

SHOCK ABSORBING GEARING

Anthony R. Biedess, Chicago, Ill., assignor to Goodman Manufacturing Company, Chicago, Ill., a corporation of Illinois Application December 31, 1953, Serial No. 401,482

16 Claims. (Cl. 64—27)

This invention relates generally to gearing and particularly to an improved shock absorbing gear which, as one of its objects, effectively absorbs a starting shock imparted to its through a mating piston.

This application is a continuation-in-part of the applicant's copending application Serial No. 225,149, filed May 8, 1951, now abandoned, for shock absorbing gearing.

Another object of the invention is to provide a gear which has resiliency incorporated into its structure for cushioning impact loads to prevent damage to the gear teeth and bearings.

Another object of the invention is to provide a gear capable of absorbing substantial amounts of impact or shock and yet which requires little or no greater physical dimensions than would an ordinary gear.

Heretofore, this shock absorbing feature has been accomplished by providing the driven gear with a mate, displaced on the same center and at a distance from the driven gear; both gears being connected by a torque shaft or tube whose function it was to absorb shock. In many instances, this conventional arrangement has been too bulky and one of the important objects of this invention is to provide an equivalent degree of shock absorption in much less space.

Briefly, the shock absorbing gear of the present invention is made in two parts frictionally engaged with one another and the drive from one part to the other is transmitted through resilient rubber-like elements. Ancillary to this, another important object is that of constructing the two gear parts so that each of the rubber-like elements is totally enclosed on all sides; by this arrangement, the rubber-like elements are capable of transmitting tremendous loads without squeezing out of place as is the case in certain conventional shock absorbing arrangements of this kind.

The improved gear comprises a hub part and a toothed part which are held together, frictionally, by spring means so that rotation of one relative to the other is resisted by the frictional engagement. Furthermore, one of the parts is provided with a number of cylindrical bores into which pins extend from the other part. The annular space between each bore and its corresponding pin is filled completely with rubber-like material. The latter is also completely contained at its ends by the two parts of the gear so there are no openings through which it can squeeze when loaded. Thus, when a torsional load is applied to the gear of sufficient magnitude to cause frictional surfaces to slip, each of the pins is shifted eccentrically within its corresponding bore to deform the rubber-like annulus by thinning it on one side and correspondingly thickening it on the other side. In other words the rubber-like material simply flows about the pin, within the bore, while at the same time absorbing shock or impact accompanying the application of load.

These and other objects and advantages of the present invention will appear from time to time as the following specification proceeds and with reference to the accompanying drawings wherein:

Figure 1 is a front elevation of one modification of the gear shown meshed with a driving pinion;

Fig. 2 is a side elevation of Fig. 1 with parts broken away to show the details of the structure;

Fig. 3 is an enlarged sectional view of Fig. 1, taken along the line 3—3 and showing one modification of the improved shock absorbing gear assembly in more detail;

Fig. 3a is a fragmentary sectional view taken along line 3a—3a of Fig. 3, but showing how each resilient element deforms when the gear is loaded;

Fig. 4 is an exploded isometric view of the gear including the modification shown by Fig. 3;

Fig. 5 is a view similar to that of Fig. 3, but showing a modification of the assembly; and Fig. 6 is an isometric view of a modification of the resilient rubber sleeve.

Referring now to the drawings, the gear, generally designated 10, comprises two basic parts; a toothed part or member 11, and a hub part or member 12. The toothed member is formed with a concentric bore 13 and a counterbore 14 of substantially greater diameter to provide a recess for an outer portion of member 12. An annular face 16 on the inwardly directed flange portion provided by the bores extends between the bore 13 and the counterbore 14.

In both modifications shown in Figs. 3 and 5, the hub member 12 conforms generally to the configuration of bores 13 and 14, the hub member being provided with a flange portion 17 having faces 18 and 19 on opposite sides of it.

A shaft engaging bore 21 is provided in the hub member 12 to receive a shaft 22 and which is fixed against rotation thereon, as by a key 23.

The flange 17 of the hub member 12 is provided with a plurality (in this case eight) of bores 24 which extend in the direction of the gear axis and which are regularly spaced about that axis at a distance therefrom. As shown in both modifications these bores 24 will preferably be cylindrical in shape and will extend through the flange 17 with substantially no obstructions.

In both modifications there is enclosed in each bore 24 a shock absorbing resilient rubber-like cushion sleeve 28 which, if desired, may be vulcanized permanently to a metal bushing 27. For convenience, this assembly of parts 27 and 28 is referred to generally in the drawings by the numeral 26. However, it is not necessary that the metal bushing 27 be incorporated with the shock absorbing sleeve 28, and Fig. 6 discloses a modification of the sleeve wherein the numeral 26' represents a shock absorbing sleeve consisting solely of a resilient rubber-like material without any metal bushing 27.

In the modification shown in Fig. 3, the shock absorbing sleeve 26 is totally enclosed within each bore 24 substantially filling the space defined by the members in assembled position, to be explained hereafter. In this modification there is but a small portion of the sleeve 26 that is not in absolute contact with the adjacent members of the assembled device.

An annular retainer ring 31 has intermittent contacting surfaces 32 abutting against the sleeve 26, with alternate weakened or spring-like sections 33 having surfaces 35. When assembled each spring-like section 33 will cover a corresponding one of the bores 24 (note Fig. 4). Each of the sections 33 is further provided with bolt holes 34 which register with the bores 24.

In the modification shown in Fig. 5, a closure member 42 having apertures therein registering within the apertures 34 of the ring 31 and bores 24 is interposed between the spring-like ring 31 and the sleeve 26. Such use of the closure member 42 provides for the sleeve 26 to completely fill the bore opening 24 and be in direct contact with an element of the assembled device on every one of the sleeves surfaces.

Centrally located within each of the bores 24 is a bolt or pin 36 which, as will be seen, holds the assembly together and transmits torque between the two main parts of the gear. Each extends through a bolt hole 37 in the toothed member and extends through a corresponding sleeve 26 or 26' and bolt hole 34 in the retainer ring. Nuts 29 engage the bolts 36 to secure the toothed member 11, the hub member 12, and the retainer ring 31 in unitary assembly.

To prevent rotation of bolts 36 in their respective sockets when they are being tightened up, they are provided with "flattened-off" heads as at 38 which are seated against a corresponding flat surface in a counterbore 39. A locking or cotter pin 41 may be utilized between the nuts and bolts.

This arrangement provides for a double frictional engagement, between surfaces 18—16 and 19—32, to resist relative rotation of the two main gear parts when driven. It will now be readily understood that by properly adjusting the nuts on the bolts 36, a predetermined frictional load may be applied between the faces 18—16 and 19—32.

In both modifications the spring-like feature of the weakened sections 33 of the retainer ring 31 serves to maintain the pressure between these frictional faces. If desired other spring means, for example lock washers or coil springs between the retainer ring and the nuts 29 may be employed instead of the weakened sections 33.

For purposes of illustration the cut-away sections 35 are somewhat exaggerated in the drawing. In the modification shown in Fig. 3, when the nuts 29 are drawn up tight, the weakened sections substantially close the adjacent ends of the bores 24. Thus, it will be understood that the resilient rubber-like sleeves 26 are, for all practical purposes, completely enclosed in their respective chambers. That is the outer surface is completely embraced by the bore 24; the inner surface is completely embraced by the bolt 36, or the bushing 27 if the bushing is used; the right end (Fig. 3) is completely embraced by the surface 16 of the toothed member; and the left end (Fig. 3) is for all practical purposes completely embraced by the retainer ring 31.

In the modification shown in Fig. 5 when the nuts 29 are drawn up tight the weakened sections 35 bear inwardly against the closure member 42 which completely closes the adjacent ends of the bores 34. Thus, it will be understood that in this modification the resilient rubber-like sleeves 26 are completely enclosed in their respective chambers. The radial outer surface of the sleeve 26 is completely embraced by the bore 24; the radial inner surface is completely embraced by the bolt 36, or the bushing 27 if the bushing is used, the right end, Fig. 5, is completely embraced by the face 16 of the toothed member 11; and the left end, Fig. 5, is completely embraced by the closure member 42.

With this structure the completely enclosed tubular rubber sleeve 26 is able to carry tremendous loads without failure. It permits the rubber to have the properties of a resilient fluid. Referring to Fig. 3a, for example, if the hub member is held stationary and an impact load applied to the toothed member in the direction of the arrow X, there will be a limited amount of relative rotation between the two parts of the gear as the shock is absorbed. During this relative movement, the rubber will flow in the direction of the small arrows as the rubber tube thins on one side and thickens correspondingly on the opposite side. By totally enclosing the rubber tube in this manner to cause this kind of distortion, it will readily return the gear parts to their normal position as soon as the impact load is relieved.

By combining the resilient rubber-like coupling means with the frictional coupling means in this manner, rebound resulting from the uncontrolled resilience of the rubber is eliminated to smooth out peaks in the transmission of power.

Functionally, it will thus be seen that the retainer ring 31 acts as a part of the toothed member 10 since it is tied thereto by means of bolts 36. Furthermore, since the metal sleeve 27 is not essential, the rubber sleeve 28 may be considered as totally enclosed by and completely filling the space defined between the two gear members 11 and 12, and the corresponding bolt 36.

The present invention is particularly advantageous when used with helical gearing, as shown. For power can be applied in such a direction that a small amount of axial shifting of one of the gear parts relative to the other will cause the frictional drag between surfaces 18—16 and 19—32 to increase whenever an impact load is applied, thereby to some degree automatically varying the frictional drag as needed, depending on the magnitude of the impact load.

In practice it has been found that the improved shock absorbing gearing may be adapted in most cases for use in the space required by conventional non-shock absorbing gearing.

Having thus described my invention for use in a particular type of gearing, it will be understood that the construction and arrangement of the various parts may be altered without departing from the spirit and scope thereof

What I claim is:

1. A shock absorbing gear comprising a toothed member and hub member rotatable about an axis, said toothed member having flange means extending radially inwardly toward said hub defining a recess, said hub member having flange means extending radially outwardly and disposed in said recess in frictional engagement with the flange of said toothed member, a closure member engaging the hub flange means opposite said first mentioned flange means, the closure member and said flanges each having aligned circumferentially spaced axially extending openings therein, bolt means disposed in said openings securing said members in frictional engagement with each other, said flanges, closure member and bolt means defining an annular bore, a shock absorbing cushion sleeve completely filling said bore, spring means carried by said bolt means engaging said closure member, and means adjustably tensioning said spring means and closure member against said hub flange and cushion sleeve to predetermine the friction load between said hub and toothed members by maintaining a selected pressure therebetween.

2. The structure defined in claim 1, wherein said resilient spring means includes an annular ring having circumferentially spaced closure member contacting portions, and weakened spring-like portions intermediate said first portions and having bolt receiving openings in said weakened portions aligned with the openings in said closure member and said flanges.

3. A structure defined in claim 2, wherein said shock absorbing cushion sleeve comprises a metal bushing secured to the radial inner portion of said sleeve adjacent to and in contact with the bolt means.

4. The structure defined in claim 3, wherein the bore is axially disposed and of cylindrical configuration.

5. A shock absorbing gear rotatable about an axis comprising an annular gear member having a circumferential toothed rim and a flange extending radially inwardly defining a friction recess, a hub member having a radially outwardly extending flange disposed in said friction recess and in frictional engagement with said gear member, an annular closure member engaging the hub flange opposite said first mentioned flange, the closure member and said flanges each having aligned circumferentially spaced axially extending openings therein, bolt means centrally disposed in said openings securing said hub member in frictional engagement with said gear member, said gear flange, hub flange, closure member and bolt means defining an annular axial extending bore, a shock absorbing cushion sleeve completely filling said bore and a means adjustably predetermining the friction load between said hub and gear members and maintaining the selected pressure therebetween including an annular spring retaining ring supported by said bolt means and in annular engagement with said closure member.

6. The structure defined in claim 5, where in the spring retaining ring comprises circumferentially spaced closure member contacting portions and weakened spring-like portions intermediate said first portions and having bolt receiving openings in said weakened portions aligned with the openings in said closure member and said flanges.

7. The structure defined in claim 6, wherein said shock absorbing cushion sleeve comprises a metal bushing secured to the radial inner portion of said sleeve adjacent to and in contact with the bolt means.

8. The structure defined in claim 7, wherein the bore is of cylindrical configuration.

9. A shock absorbing gear comprising driving and driven members, each of said members having flanges extending radially toward the other and said flanges being in frictional engagement with each other, a closure member engaging one of said flanges opposite said other flange, the closure member and said flanges each having aligned circumferentially spaced axially extending openings therein, means disposed in said openings securing the members in frictional engagement, said flanges, closure member and securing means defining an annular bore, a shock absorbing cushion sleeve completely filling said bore and spring means supported by said securing means adjustably predetermining the friction load between said members by maintaining a selected pressure therebetween.

10. The structure defined in claim 9, wherein the spring means includes an annular ring having circumferentially spaced closure member contacting portions, and weakened spring-like portions intermediate said first portions and having securing means receiving openings in said weakened portions aligned with the openings in said closure member and said flanges.

11. The structure defined in claim 10 wherein said shock absorbing cushion sleeve comprises a metal bushing secured to the radial inner portion of said sleeve adjacent to and in contact with the bolt means.

12. The structure defined in claim 11, wherein the bore is axially disposed and of cylindrical configuration.

13. A shock absorbing gear comprising a toothed member and an associated hub member rotatable about an axis, said toothed member having flange means extending radially inwardly toward said hub defining a recess, said hub member having flange means extending radially outwardly and disposed in said recess in frictional engagement with the flange of said toothed member, said outwardly and inwardly extending flange means each being provided with a series of bores circumferentially spaced extending laterally therethrough, a shock absorbing cushion sleeve disposed within each of said bores of said outwardly extending hub flange means, bolts extending through the apertures in said inwardly extending flange means and having intermediate shank portions thereof disposed within said cushion sleeves, a retainer ring means disposed in engagement with said hub flange means opposite said frictional engagement, said ring means having circumferentially spaced contacting portions and weakened spring-like portions intermediate said first portions and a plurality of circumferentially spaced bolt receiving apertures in said weakened spring-like portions disposed in alignment with the apertures of said flange means and said bolts extending through said ring means apertures.

14. The structure defined in claim 13, wherein said shock absorbing cushion sleeve comprises a metal bushing secured to the radial inner portion of said sleeve adjacent to and in contact with the bolt means.

15. The structure defined in claim 14, wherein the bore is axially disposed and of cylindrical configuration.

16. The structure defined in claim 13, wherein the outer end portions of said bolts have heads with flattened peripheral portions and a counterbore in the outer face of said inwardly extending flange presenting flat faces opposing said flattened head portions for preventing rotation of the bolts.

References Cited in the file of this patent

UNITED STATES PATENTS

| | | |
|---|---|---|
| 379,022 | Morgan | Mar. 6, 1888 |
| 795,845 | Muller | Aug. 1, 1905 |
| 1,760,492 | Hall | May 27, 1930 |
| 2,372,625 | Denton | Mar. 27, 1945 |